Patented Aug. 25, 1925.

1,550,869

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

BUTYRALDEHYDE COMPOSITION.

No Drawing.   Application filed December 15, 1924. Serial No. 756,157.

*To all whom it may concern:*

Be it known that I, CHARLES BOGIN, a citizen of the United States, residing in the city of Terre Haute, county of Vigo, and State of Indiana, have invented a certain new and useful Butyraldehyde Composition, of which the following is a specification.

My invention relates to a new composition consisting of butyraldehyde in admixture with small quantities of other substances, and relates more specifically to a method of preparing a stable form of normal butyraldehyde.

Normal butyraldehyde is a colorless liquid which boils at 73-74° C. under atmospheric pressure. It has a specific gravity of 0.817 and is soluble in water to the extent of about four per cent. Normal butyraldehyde has a characteristic suffocating odor, and it is further characterized by a lack of chemical stability.

Normal butyraldehyde is employed in various chemical processes and as an ingredient in rubber compositions. In the past, difficulty has arisen in industrially utilizing normal butyraldehyde on account of its chemical instability. The material is easily oxidized to butyric acid when in contact with the atmosphere, and decomposes spontaneously to some extent, even in the absence of air.

I have discovered that the oxidation of normal butyraldehyde caused by contact with the atmosphere or by spontaneous decomposition, is practically inhibited by certain substances which may be described as "anti-oxygen catalysts."

Hydroquinone; resorcinol; pyrogallol; and the halogens—iodine, chlorine and bromine; are substances which, when dissolved in small quantities in normal butyraldehyde, inhibit the oxidation of the aldehyde and may thus be classed as "anti-oxygen catalysts".

These substances when present in minute quantities, as for example .01 per cent, exert a powerful stabilizing action on normal butyraldehyde and greatly improve the keeping qualities of the material. When as much as .25 per cent of an anti-oxygen catalyst is present, oxidation of normal butyraldehyde is inhibited even under the most rigorous conditions. I have discovered iodine to be the most effective anti-oxygen catalyst for improvement with normal butyraldehyde.

For example, .25 per cent of iodine present in normal butyraldehyde effectively prevents the oxidation of the latter substance under the most severe conditions of laboratory testing as is indicated by the following example.

*Example.*

300 cubic centimeters of commercial normal butyraldehyde (containing about one and one-half per cent of butyric acid) was placed in a 500 c. c. round bottom glass flask and air, at five pounds pressure, was bubbled into the butyraldehyde through a glass tube with an orifice one-fourth inch in diameter, for thirty hours. At the end of this period the butyraldehyde was found to contain 25.3 per cent butyric acid. Under similar conditions, a sample of normal butyraldehyde containing .25 per cent of iodine increased in acidity to 3.6 per cent.

Under ordinary conditions of atmospheric exposure, .01 per cent of iodine in normal butyraldehyde will substantially prevent the tendency of the latter substance to oxidize and will thus prevent an increase in acidity beyond the normal acidity of commercial butyraldehyde, i. e., 1.5 per cent.

The advantages of my discovery concerning the stabilization of normal butyraldehyde are obviously real and substantial. By the practice of my invention I am able to prepare normal butyraldehyde in such a manner that it will stand exposure to the air and will remain stable for long periods of time. This stabilizing action is obtained without greatly modifying the properties of normal butyraldehyde as the small proportions of anti-oxygen catalysts necessary do not, in any way, interfere with the employment of normal butyraldehyde in industrial chemical operations or as an ingredient in rubber compositions.

Now, having fully described my invention, I claim the following as new and novel:—

1. A composition of matter comprising normal butyraldehyde containing .01%–.25% of an anti-oxygen catalyst.

2. A composition of matter comprising normal butyraldehyde and a halogen.

3. A composition of matter comprising normal butyraldehyde and iodine.

4. A composition of matter comprising normal butyraldehyde and .01%–.25% of iodine.

CHARLES BOGIN.